March 24, 1936.  N. REINER  2,034,959

GRASSHOPPER EXTERMINATOR

Filed Sept. 12, 1935  2 Sheets-Sheet 1

INVENTOR.
N. Reiner.
BY F. Ledermann
ATTORNEY.

March 24, 1936.  N. REINER  2,034,959
GRASSHOPPER EXTERMINATOR
Filed Sept. 12, 1935   2 Sheets-Sheet 2
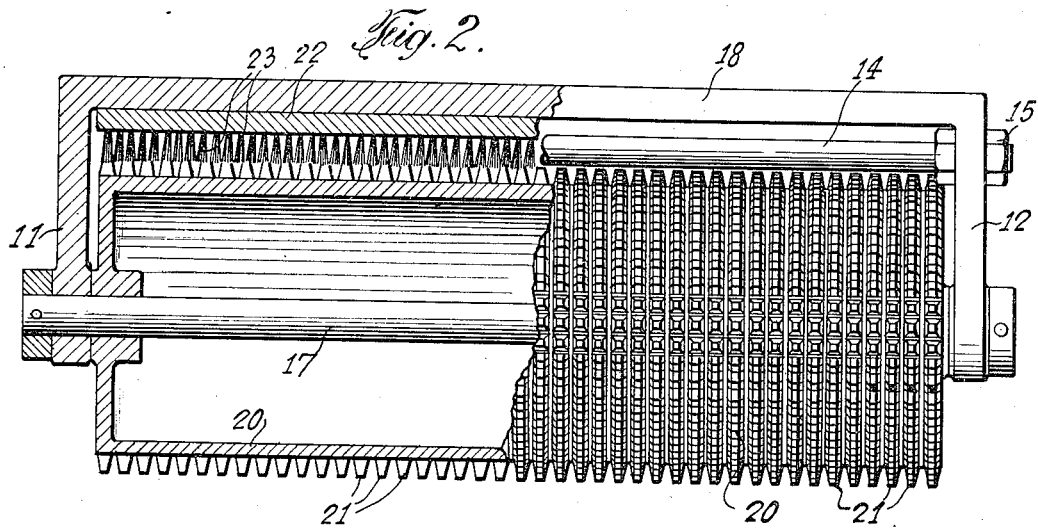
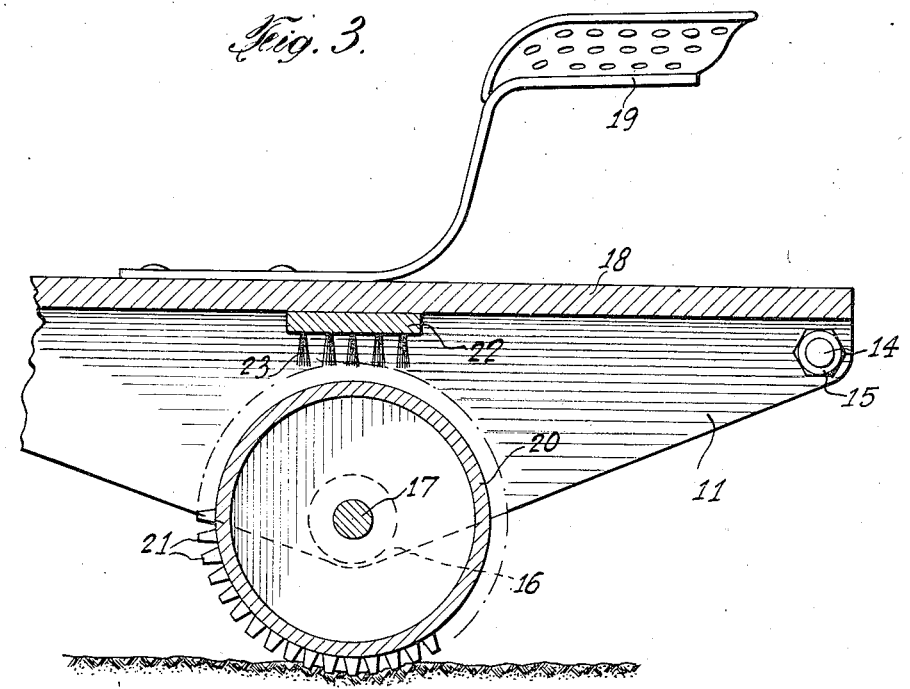
INVENTOR.
N. Reiner.
BY F. Ledermann
ATTORNEY.

Patented Mar. 24, 1936

2,034,959

UNITED STATES PATENT OFFICE 2,034,959

GRASSHOPPER EXTERMINATOR

Nickolaus Reiner, Gladstone, N. Dak.

Application September 12, 1935, Serial No. 40,259

2 Claims. (Cl. 55—24)

One object of this invention is the provision of a device or machine for destroying grasshoppers and similar pests which infest farmlands and cause extensive destruction of crops, the device serving to kill the larvæ and the young of the insects.

Another object is the provision of such a device in the form of a draft vehicle adapted to be drawn over a field by draft animals or automotive power.

A further object is the provision of such a vehicle with a drum or roller having prongs or teeth extending radially from its peripheral surface, the prongs digging into the earth as the roller passes thereover and crushing both the insects and their larvæ, as well as their eggs.

The above and other objects will become apparent in the description below, in which characters of reference refer to like-named parts in the accompanying drawings which form a part of this specification.

Referring briefly to the drawings, Figure 1 is an underside plan view of the device.

Figure 2 is a cross-sectional view taken on the line 2—2 of Figure 1.

Figure 3 is a cross-sectional view taken on the line 3—3 of Figure 1.

Figure 1:
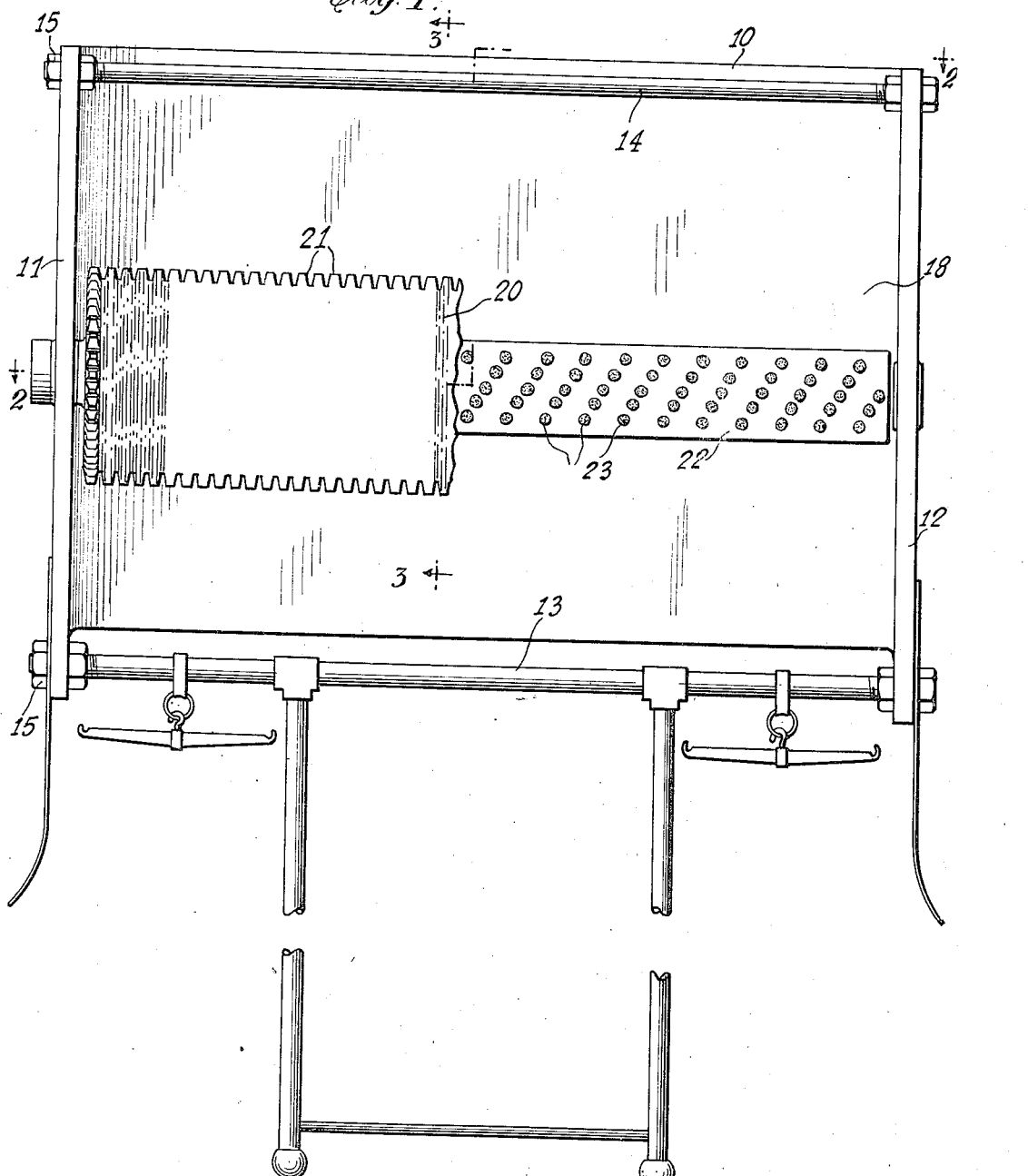

Referring in detail to the drawings, the numeral 10 represents a substantially rectangular horizontal frame having the four sides 11, 12, 13, and 14. These sides of the frame are firmly interlocked by means of screw threads on the ends of the members 13 and 14, and nuts 15 threaded thereon to clamp the members 11 and 12 thereagainst. The side members 11 and 12 are of triangular shape, with the central depending tip 16 having a bearing therein in which an axle 17 is rotatably mounted. A horizontal frame member 18 is integral with the side members 11 and 12 and provides a platform which covers the members mounted therebeneath. On this platform 18 is mounted the driver's seat 19.

A hollow roller 20 is integrally mounted about the axle 17. The entire peripheral surface of the roller 20 has teeth 21 extending therefrom. These teeth taper toward their extremities and their ends are flattened.

A brush 22 whose bristles are shown at 23 is mounted on the underside of the platform 18 directly above the roller 20. The bristles 23 are made of rather stiff material.

In use, the vehicle is drawn over the field, whence the roller 20 rotates. In doing so, the teeth 21 dig into the earth and crush the young grasshoppers, their larvæ, and their eggs, at the same time driving the crushed remains into the earth. The brush 22 serves to clean the teeth prior to their next contact with the earth as the roller progresses.

It is thus apparent that a device has been provided which serves to effectively kill and destroy grasshopper pests before they reach maturity. By destroying these insects while they are young, not only the destruction which they cause is prevented, but also the multiplication of the insects through reproduction later if they were permitted to live.

Obviously, modifications in form and structure may be made without departing from the spirit of the invention.

I claim:

1. A draft vehicle comprising a rectangular frame having a platform thereon, a roller rotatably mounted in said frame under said platform, radial teeth projecting from the surface of said roller and adapted to dig into the earth as the roller turns, and a brush mounted under said platform and over said roller to clean the teeth of the roller.

2. A draft vehicle comprising a rectangular frame having a platform thereon, a driver's seat mounted on said platform, a roller rotatably mounted in said frame under said platform, radial teeth projecting from the surface of said roller and adapted to dig into the earth as the roller turns, said teeth tapering toward their extremities and having flattened ends, and a brush mounted between said platform and roller to clean the teeth of the roller as the latter turns.

NICKOLAUS REINER.